(12) United States Patent
Kellermann

(10) Patent No.: US 8,172,038 B2
(45) Date of Patent: May 8, 2012

(54) SILENCER FOR A MOTOR DEVICE

(75) Inventor: Christian Kellermann, Stapelfeld (DE)

(73) Assignee: DOLMAR GmbH, Hamburg (DE)

( * ) Notice: Subject to any disclaimer, the term of this patent is extended or adjusted under 35 U.S.C. 154(b) by 0 days.

(21) Appl. No.: 12/422,786

(22) Filed: Apr. 13, 2009

(65) Prior Publication Data

US 2009/0255519 A1  Oct. 15, 2009

(30) Foreign Application Priority Data

Apr. 14, 2008  (DE) .................... 20 2008 005 168 U

(51) Int. Cl.
  *F01N 13/10*  (2010.01)
(52) U.S. Cl. ........ 181/240; 181/212; 181/227; 181/228; 181/230; 181/258; 123/65 R; 60/302; 60/299
(58) Field of Classification Search .................. 181/240, 181/227, 228, 230, 258; 123/65 R; 60/302, 60/299
See application file for complete search history.

(56) References Cited

U.S. PATENT DOCUMENTS

| | | | | |
|---|---|---|---|---|
| 2,393,341 | A | * | 1/1946 | Schneider .................... 123/65 R |
| 4,142,607 | A | * | 3/1979 | Landwehr et al. ............. 181/259 |
| 4,779,703 | A | * | 10/1988 | Takiguchi et al. ............. 181/228 |
| 6,164,066 | A | | 12/2000 | Sakaguchi et al. |
| 6,341,662 | B1 | * | 1/2002 | Karlsson ........................ 181/230 |
| 6,698,194 | B2 | | 3/2004 | Blair et al. |
| 6,955,043 | B2 | * | 10/2005 | Schlossarczyk et al. ....... 60/299 |
| 7,357,221 | B2 | * | 4/2008 | Maier ............................ 181/268 |
| 2001/0037912 | A1 | * | 11/2001 | Menzel ........................ 181/231 |
| 2003/0062216 | A1 | | 4/2003 | Tajima et al. |
| 2005/0217931 | A1 | * | 10/2005 | Assad ............................ 181/258 |
| 2006/0219203 | A1 | | 10/2006 | Kellermann |
| 2007/0251761 | A1 | * | 11/2007 | Nishimura et al. ........... 181/258 |
| 2008/0017444 | A1 | | 1/2008 | Dowdy |
| 2008/0035098 | A1 | | 2/2008 | Menzel et al. |

FOREIGN PATENT DOCUMENTS

| | | |
|---|---|---|
| DE | 19902915 A1 | 7/1999 |
| DE | 10020373 A1 | 10/2001 |
| DE | 69805312 T2 | 12/2002 |
| DE | 202005005328 | 8/2006 |
| DE | 102006037201 A1 | 2/2008 |

OTHER PUBLICATIONS

Andreas Jager; Untersuchungen zur Entwicklung eines Zweitaktmotors mit hoher Leistungsdichte und niedrigen Kohlenwasserstoffemissionen; Apr. 2005; pp. 11 & 12.
German Search Report, Feb. 10, 2010.

* cited by examiner

*Primary Examiner* — Forrest M Phillips
(74) *Attorney, Agent, or Firm* — Kelly & Kelley, LLP

(57) ABSTRACT

A silencer for a two-stroke engine includes a first chamber and a second chamber, wherein a flow channel is provided between an outlet of a combustion chamber and the first chamber. A high charge degree of the combustion chamber has a pressure ratio in the region of the outlet which reduces or prevents an escape of fresh gas from the combustion chamber. The flow channel between the outlet and the first chamber is flow-favorably shaped in such a manner that the exhaust gas that flows out of the outlet because of its mass inertia predominantly flows into the first chamber and following charging of the first chamber flows back again and as a result a back pressure is formed in the direction of the combustion chamber.

14 Claims, 5 Drawing Sheets

SILENCER FOR A MOTOR DEVICE

The present invention relates to a silencer for a motor device with a combustion engine, more preferably for a hand-operated small device such as for example a garden and park maintenance device or for a light motorcycle, a marine engine or the like according to the preamble of Claim 1. The motor device is embodied with a piston engine, more preferably two-stroke engine wherein the silencer can be brought in connection with the outlet of the combustion chamber of the piston engine. The silencer comprises at least one first chamber and a second chamber, wherein at least between the outlet and the first chamber a flow channel is formed.

In order to reduce or avoid harmful post-exhaust of an uncombusted fuel-air mixture in two-stroke engines devices are known which are arranged on the outlet of the combustion chamber in order to generate a certain back pressure. However the problem arises that with exhaust back pressure that is too low too much fresh gas escapes into the exhaust system connected downstream of the two-stroke engine, whereas with exhaust back pressure that is too high, not enough fresh gas can get into the cylinder of the engine. Two-stroke engines can be designed in such a manner that at high speeds a high exhaust back pressure is created which can however not be achieved at low speeds. Generally this results in the objective to generate gas vibrations after the outlet in a wide speed range so that the harmful post-exhaust is reduced and the charging degree of the combustion chamber with fresh gas is nevertheless maintained.

Figure 3:
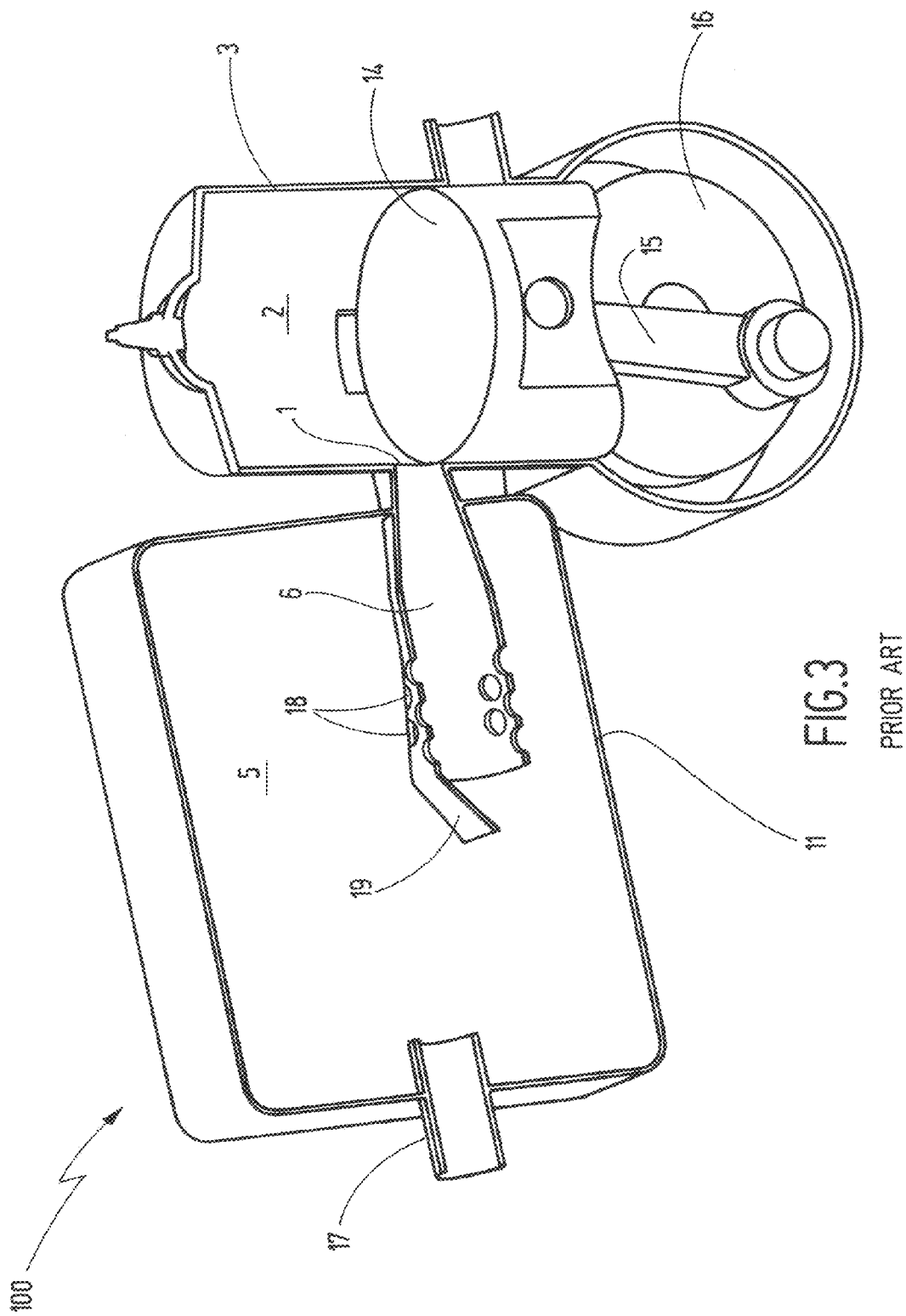

A known embodiment of a silencer 100 is shown in FIG. 3. This can be connected to a piston engine 3 which is embodied as two-stroke engine and comprises a crank drive with a crankshaft 16, a connecting rod 15 and a piston 14 which is stroke-moveably guided in the cylinder, which piston dynamically limits a combustion chamber 2. The exhaust gas is discharged from the combustion chamber 2 via an outlet 1 and via a flow channel 6 reaches the chamber 5 of the silencer 100 which is enclosed by the silencer housing 11. The flow channel 6 on the end side freely terminates in the chamber 5, wherein said flow channel is shown with a perforation 18 through which a part of the exhaust gas can radially flow out of the flow channel 6 and enter the chamber 5. At the end side the flow channel 6 possesses a moulded-on screen 19 in order to dampen the sound of the outflowing exhaust gas at least partially in the direction towards the outlet 17 via which the exhaust gas reaches the open from the chamber 5. It is however disadvantageous that with the shown embodiment of the flow channel 6 no exhaust back pressure in the outlet 1 can be generated from the direction of the silencer 100, as a result of which uncombusted fresh air enters the silencer.

A further embodiment of a silencer is known from DE 20 2005 005 328 U1, which is arranged on the exhaust gas outlet of the piston engine. The silencer has a first chamber and a second chamber both of which are connected with the exhaust gas outlet. Exhaust gas flows through each the first and second chamber, wherein the first chamber is embodied largely closed and the exhaust gas is conducted into the open only through the second chamber via an outlet on the silencer side. Here it is provided that the outlet comprises fastening means on which a separating wall is detachably arranged which directs the exhaust gas in part into the first and in part into the second chamber. The sub-division of the outlet on the one hand in the direction of the first and on the other hand in the direction of the second chamber is orientated across the stroke direction of the piston of the piston engine so that during the upward movement of the piston the exhaust gas can initially flow in both chambers and on reaching the separating wall only into the first chamber. The first chamber thus acts as a buffer chamber, wherein through the exhaust gas that flows into the buffer chamber the power stroke of the combustion engine is not obstructed. Once the piston during its upward movement reaches the separating wall with the piston upper edge the exhaust gas still present in the combustion chamber can escape into the silencer and be discharged into the open. As soon as the piston during the subsequent compression stroke again closes the buffer chamber towards the cylinder, the residual exhaust gas still present in the buffer chamber can escape into the silencer through the opening arranged between buffer chamber and silencer and remove the pressure in the buffer chamber. However in addition to the exhaust gas, fresh gas also gets into the outlet and thus into the silencer which is accompanied by a reduction of the efficiency of the engine and results in an increase of the pollutant emission.

It is thus the object of the present invention to provide a silencer for a motor device with a combustion engine which overcomes the disadvantages of the aforementioned prior art and with high charging degree of the combustion chamber comprises a pressure ratio in the region of the outlet which reduces or avoids that fresh gas escapes from the combustion chamber.

This object is solved based on a silencer for a motor device according to the preamble of Claim 1 in conjunction with the characterising features. Advantageous further developments of the invention are stated in the dependent claims.

The invention includes the technical teaching that the flow channel between the outlet and the first chamber is embodied in a straight line such that the exhaust gas flowing out of the outlet because of its mass inertia largely flows into the first chamber and after charging the first chamber, flows back again and as a result back pressure is formed in the direction of the combustion chamber.

The generation of the desired back pressure is achieved through a new kind of flow channel which is embodied in a straight line in order to favour the flow of the exhaust gas into the first chamber. The exhaust gas is initially accelerated into the flow channel through the combustion engine and has a mass inertia. Regardless of auxiliary connections of the flow channel the exhaust gas mass flow because of its mass inertia moves into the first chamber, charging the latter up to a limit pressure. Once this limit pressure is reached the exhaust gas mass flow flows back in the direction of the outlet of the combustion chamber. In the process back pressure is generated which prevails against the outlet at the moment when fresh gas has already entered the combustion chamber and thus an escape of the fresh gas from the outlet is efficiently avoided.

Furthermore the pollutant emissions of the combustion engine are also lowered through the invention since the fresh gas is more utilized for power generation of the engine and does not reach the silencer and thus the environment in the uncombusted state. The flow channel can run along a channel axis which approximately stands perpendicularly on the movement direction of the piston. The flow channel extends between outlet and the first chamber, wherein said flow channel is flow-favourably moulded and according to a preferred embodiment runs along a straight axis. A fluidic communication with the second chamber of the silencer in this case does not obstruct the formation of the pressure vibration against the outlet from the direction of the silencer. The geometrical embodiment and the arrangement of the auxiliary flow channels between the two chambers of the silencer are thus described in more detail in the following.

It is an advantage that the first chamber is enclosed by the second chamber and the predominant part of the exhaust gas flows into the second chamber only after flowing through the first chamber.

In order to make possible overflowing of the exhaust gas from the first chamber into the second chamber a main outlet is provided which forms a flow connection between the flow channel and the second chamber. The flow channel extends concentrically about a channel axis which describes the longitudinal direction of the flow channel. The main outlet is embodied as pipe section and substantially runs perpendicularly to the channel axis of the flow channel, so that at least one T-shaped connection is formed.

A fast flow, which prevails in the flow channel during the exhaust process, initially takes the straight line route in the direction of the first chamber since the mass inertia of the gas stops an abrupt directional change in the direction of the main outlet. As a result the volume of the first chamber is filled until the decreasing pressure differential decelerates the flow in the flow channel to the extent that the exhaust gas can then flow through the main outlet. Consequently the exhaust gas now flows from the first chamber via the main outlet into the second chamber which forms the actual silencer volume. In the process back pressure is generated on the outlet of the combustion chamber. This outflow process prevails until through the piston movement the outlet opens again and a rapid flow in the direction of the volume of the first chamber is again built up and because of its perpendicularly outflowing embodiment no flow through the main outlet takes place any longer. Since speed of sound is reached in the flow channel and the dimensions are very short and the channel has a small diameter, a disturbing resonance at usual speeds is effectively stopped.

The advantage of the configuration of the flow channel according to the invention is that the exhaust process is not initially influenced since the pressure differential is above the critical pressure ratio and the exhaust gas is able to flow out of the combustion chamber. The volume ratio of the first chamber to the flow channel, the diameter of the flow channel and the remaining geometrical design is designed in such a manner that the back pressure from the first chamber can build up in the direction of the combustion chamber when the stroke-moveable piston is in a stroke position in which the overflow channels are already closed but the outlet is not yet closed through the upward-directed stroke movement of the piston. At the end of the exhaust process when the overflows are already closed and the outlet is still open the back pressure counteracting the exhaust flow can, through matching of the mentioned geometrical embodiment of the flow channel, be achieved in the required amount at the required time, wherein the back pressure can be present suddenly. As a result the silencer controls the volumetric flow in the outlet in such a manner that scavenging is intense at first and at the end of the scavenging process is suddenly braked through the sudden high back pressure. As a result, the scavenging losses are clearly lowered over a wide speed range.

The return flow, which forms the back pressure in the direction of the outlet, can be formed from the first chamber and at least partially from the flow channel, since both volumes merge.

According to a further advantageous embodiment the flow channel is designed in two parts and has an interruption which is embodied ring-shaped about the channel axis. With this a further geometrical embodiment of the flow channel is proposed which can be sub-divided into a first part and a second part. The first part is connected with the combustion chamber of the piston engine, wherein the second part is in connection with the first chamber. The interruption between the first part and the second part thus brings about a separation of the parts of the flow channel and at the same time forms the main outlet of the flow channel in order to form a fluidic connection between the flow channel and the second channel.

The first part of the flow channel forms a first opening in the direction of the first chamber, whereas the second part of the flow channel forms a second opening in the direction of the combustion chamber. The first opening of the first part at least partially extends into the second opening of the second part. Between the first opening and the second opening a radially circumferential spacing extends for forming the main outlet. Consequently the exhaust gas can enter the second chamber via a ring-shaped flow from the flow channel which chamber also according to this embodiment forms the actual silencer volume. Because of the arrangement of the first opening which at least by sections extends into the second opening, the charging of the first chamber is favoured since in the manner already described above the outflowing exhaust gas is moved in a straight line in the flow channel. Consequently the exhaust gas only escapes to a minor part through the ring-shaped circumferential main outlet. Only when the decreasing pressure differential slows the flow of the exhaust gas in the flow channel so far and a return flow takes place can the exhaust gas escape into the second chamber through the ring-shaped main outlet. Nevertheless, sufficient exhaust gas is fed back in the direction of the outlet of the combustion chamber so that the required back pressure is generated. Here it is also conceivable that the ring-shaped main outlet is configured nozzle-shaped and tapers off accordingly, as a result of which the ring-shaped gap itself becomes smaller until the exhaust gas finally enters the second chamber. It is provided according to a further preferred embodiment that the second opening of the second part at least partially extends into the first opening of the first part or the first opening of the first part and the second opening of the second part are arranged opposite each other subject to the formation of a gap or ring gap.

Between the first chamber and the second chamber an auxiliary outlet can be provided according to a further preferred embodiment which extends through a wall of the first chamber so that at least a part of the exhaust gas can flow through the auxiliary outlet from the first chamber into the second chamber. The greater the auxiliary outlet is configured in cross section, the smaller is the reverse-acting back pressure against the outlet of the combustion chamber since more exhaust gas is able to escape through the auxiliary outlet.

The combustion chamber of the piston engine can have a stroke volume wherein the volume of the first chamber corresponds approximately to the stroke volume and preferably half the stroke volume of the combustion chamber. Through the volume ratio an advantageous pressure vibration can be caused so that interfering resonance at usual speeds of the piston engine is avoided, which more preferably can be achieved with a volume ratio when the volume of the first chamber corresponds to half the stroke volume of the combustion chamber. More preferably the back pressure that can be achieved can be optimised both with respect to the timing as well as the amount of the back pressure through advantageous geometrical embodiment of the volume of the first chamber relative to the volume of the flow channel and the combustion chamber.

The second chamber is formed through a wall which constitutes the silencer housing of the silencer. The first chamber is formed at the end side on the flow channel wherein the flow channel can merge in one part with the wall of the first chamber. Here, the flow channel can be led out of the wall of the silencer housing and the silencer is connected to the piston engine via the part of the flow channel that is led out of the silencer housing. The connection between the wall of the silencer housing and the flow channel can be a soldered connection and preferably a welded connection. However a crimping connection or a folding or flanging connection is also possible.

The piston engine is embodied as a one-cylinder two-stroke engine and comprises overflow channels via which the fuel-air mixture can enter the combustion chamber and which are opened and closed via the stroke-moveable piston limiting the combustion chamber. Furthermore the stroke-moveable piston sweeps the outlet of the combustion chamber so that the latter is likewise opened and closed through the piston edge, wherein the piston in the upward stroke closes the outlet later than the overflow channels.

It is likewise conceivable to additionally embody the silencer with a catalytic converter element so that further pollutant reduction in the exhaust gas can be achieved. For example a catalytic converter element, which is designed honeycomb-like or perforated plate-like can be arranged in or directly after the main outlet. Obviously the catalytic converter element can also be provided between the flow channel and the first chamber. In addition to this, further arrangements of one or a plurality of catalytic converter elements are also conceivable.

The present invention likewise refers to a piston engine with a silencer which is in connection with the outlet of the combustion chamber of the piston engine and comprises at least a first chamber and a second chamber, wherein at least between the outlet and the first chamber a flow channel is formed. Here it is provided that the flow channel between the outlet and the first chamber is flow-favourably formed in a straight line in such a manner that the exhaust gas flowing out of the outlet because of its mass inertia predominantly flows into the first chamber and after charging of the first chamber flows back again, as a result of which back pressure is formed in the direction of the combustion chamber.

Figure 1:
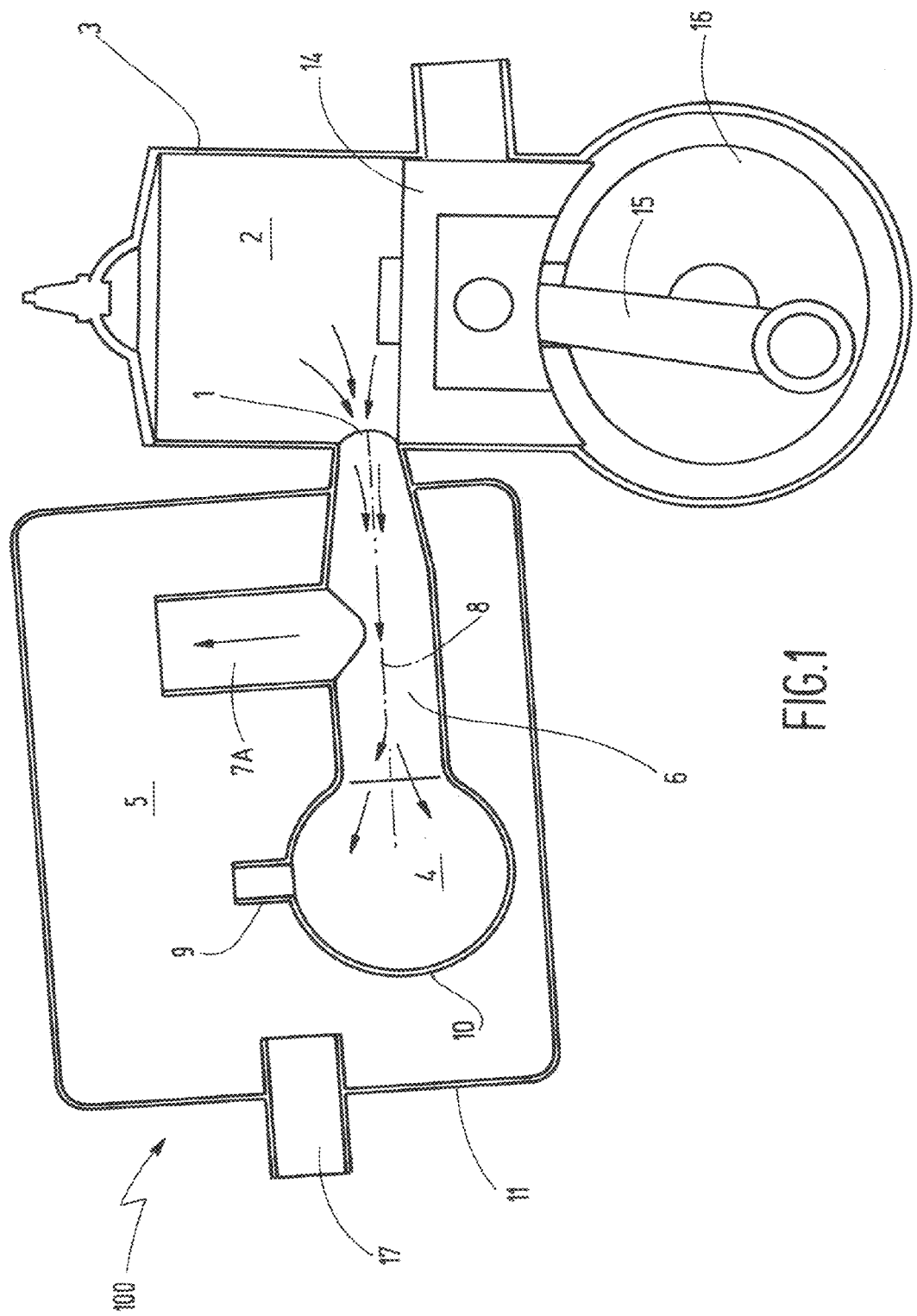
Figure 2:
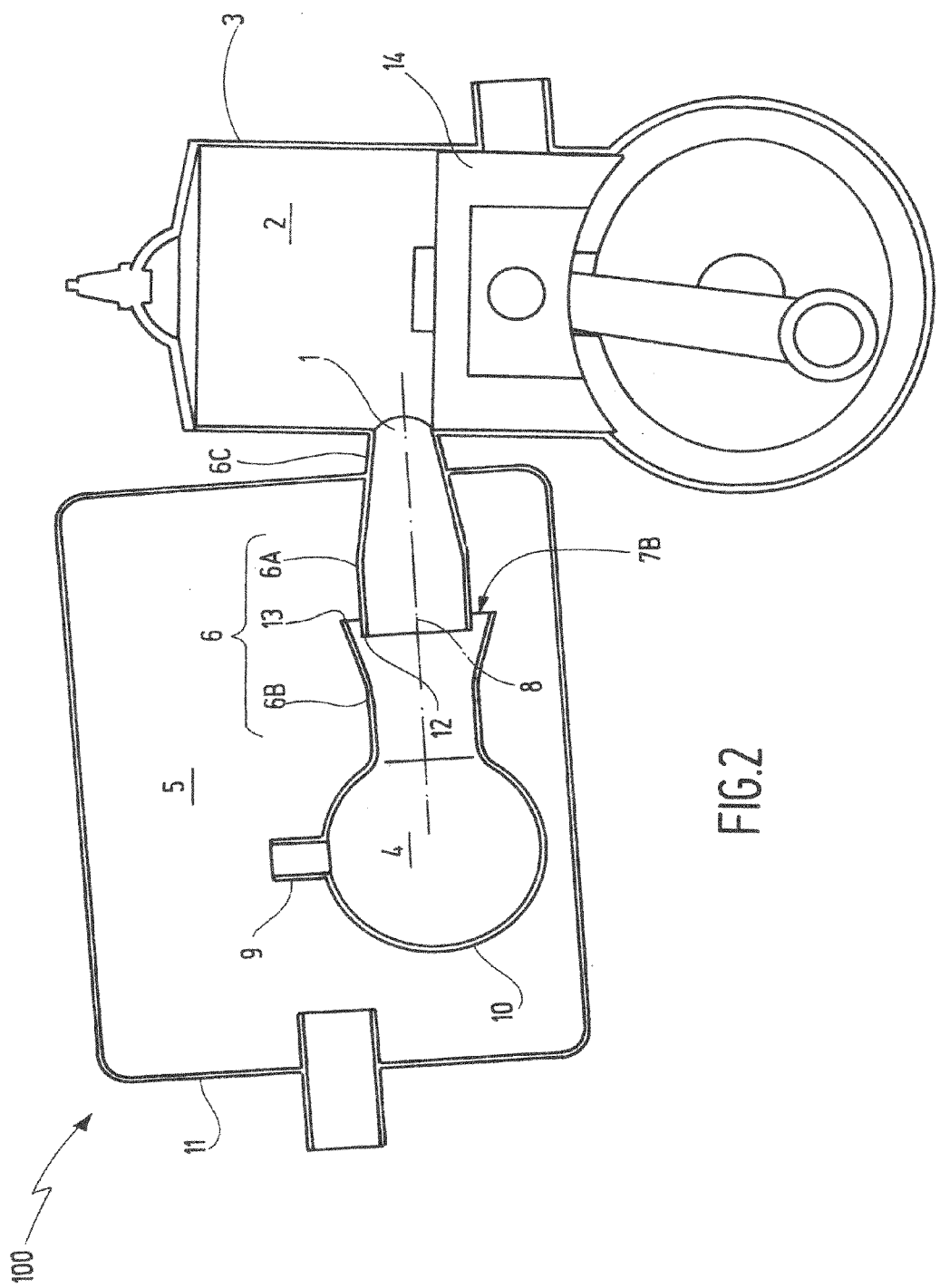
Figure 4:
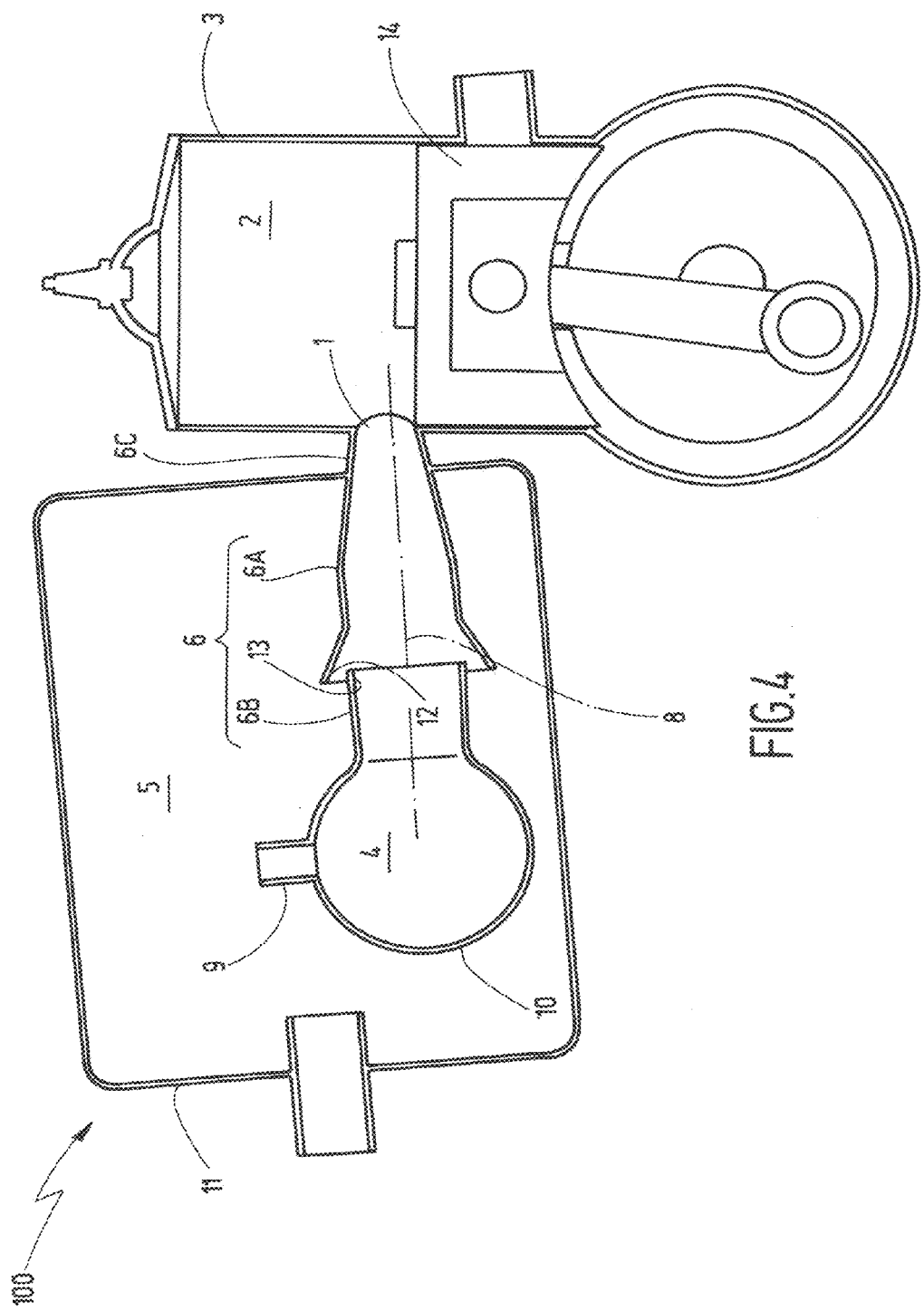
Figure 5:
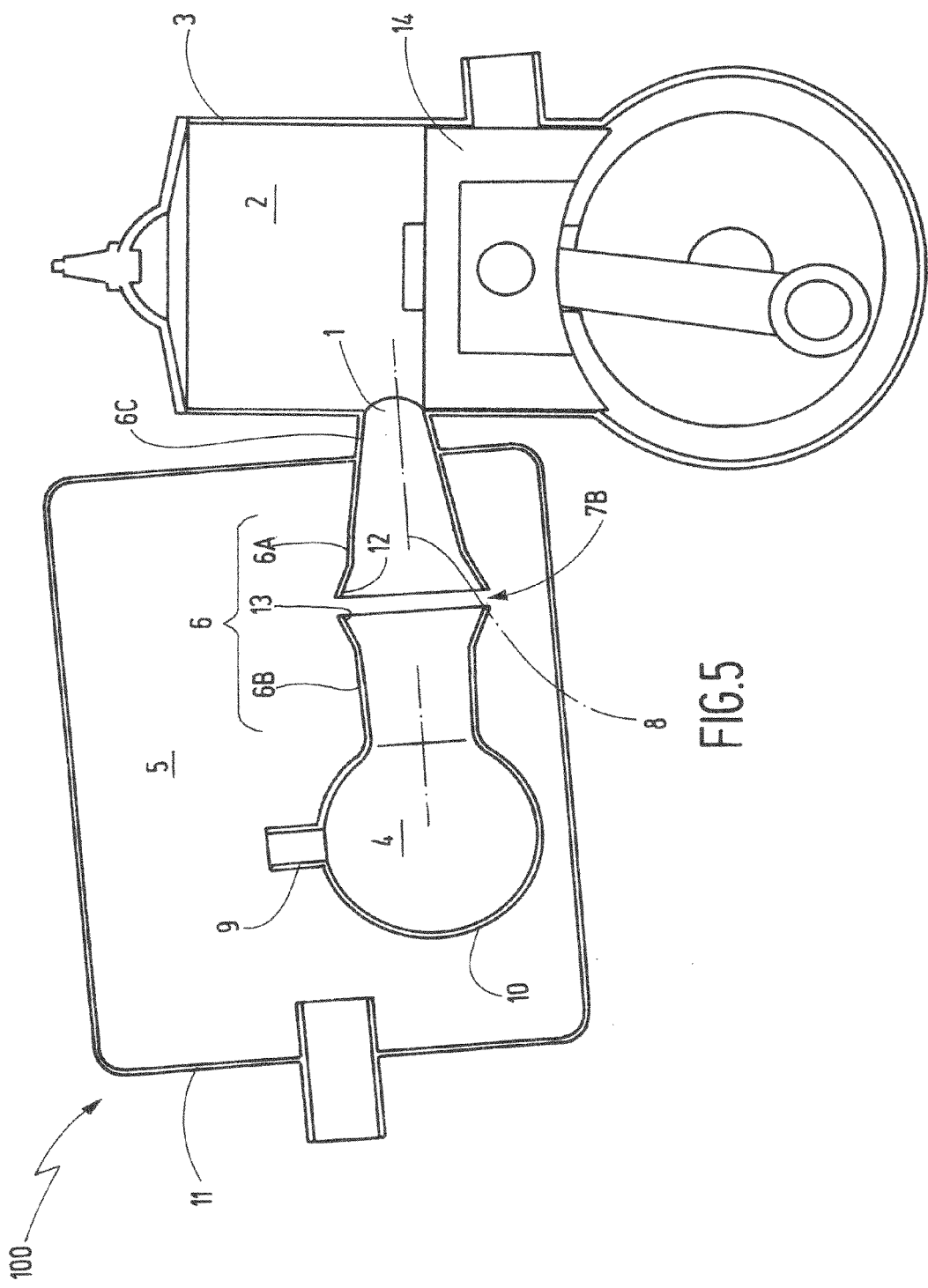

Further measures improving the invention are shown in more detail in the following by means of the figures jointly with the description of a preferred exemplary embodiment of the invention. It shows in purely schematic view:

FIG. 1 in a sectional view of a first exemplary embodiment of the silencer for a motor device according to the invention with a flow channel designed in one part, which extends along a straight channel axis and FIG. 2 as well as FIGS. 4 and 5 sectional views from further exemplary embodiments of a silencer for a motor device with a flow channel embodied in two parts and FIG. 3 in a sectional view an embodiment of a silencer according to the prior art.

The silencer 100 shown in FIG. 1 is arranged on an outlet 1 which makes possible exhausting of the fuel-air mixture combusted in the combustion chamber 2 of the piston engine 3. The piston engine 3 comprises a piston 14 which in known manner is connected with a crankshaft 16 via a connecting rod 15 and is suitable for driving hand-held small devices such as garden and park maintenance devices, chainsaws, lawn mowers and the like. Such motor devices are however also used for light motorcycles or for example as marine engines.

From the combustion chamber 2 the exhaust gas flows through the outlet 1 into a flow channel 6, via which the silencer 100 is fastened to the piston engine 3, wherein the connection between the combustion chamber end of the flow channel 6 and the piston engine 3 is shown in simplified form. The flow of the exhaust gas through the outlet 1 into the flow channel 6 is indicated through arrows. Here it is visible that the flow channel 6 extends along a linear channel axis 8 and forms a straight pipe section. Through the straight line embodiment of the flow channel 6 the exhaust gas can be accelerated in the direction of a first chamber 4 in such a manner that said exhaust gas cannot overflow from the main outlet 7a into a second chamber 5 of the silencer 100 or only to a minor part. Escape of the exhaust gas via the main outlet 7a in the direction of the second chamber 5 is avoided in that the main outlet 7a extends approximately perpendicularly to the channel axis 8. Because of the acceleration of the exhaust gas in the direction of the first chamber 4 said gas follows the linear route because of the mass inertia of the exhaust gas and closes the main outlet 7a.

Only when the pressure in the volume of the first chamber 4 increases greatly and the flow velocity of the exhaust gas in the flow channel 6 is slowed down can exhaust gas escape into the second chamber 5 via the main outlet 7a. Upon a return flow of the exhaust gas from the first chamber 4 in the direction of the outlet 1 back pressure is built up against the outlet 1 which prevents escaping of fresh gas from the combustion chamber 2. The period of time which passes in order to build up the back pressure in the region of the outlet 1 approximately corresponds to the period of time after the combustion until the piston 14, which is longitudinally moveably guided in the piston engine 3, again closes the outlet 1 through sweeping over said outlet. Consequently a charge change is possible wherein both effective discharge of the exhaust gas as well as effective supply of fresh gas is possible.

The first chamber 4 is formed through a wall 10 which in one piece merges with the flow channel 6. The second chamber 5 is enclosed by a silencer housing 11 having an outlet 17 through which the exhaust gas is finally conducted into the open. Between the first chamber 4 and the second chamber 5 an auxiliary outlet 9 is provided which describes an opening in the wall 10. Through the auxiliary outlet 9 at least a part of the exhaust gas flowing into the first chamber 4 can directly escape into the second chamber 5. This brings about a reduction of the back pressure without enlarging the volume of the first chamber 4. As a result a silencer 100 is provided through which the pollutant limit values when operating the motor device can be maintained. If a catalytic converter as additional component is provided in the exhaust gas tract of the piston engine 3 this can be designed smaller. The volume of the first chamber 4 can advantageously correspond to approximately half the stroke volume of the combustion chamber 2.

FIG. 2 shows a further exemplary embodiment of the silencer 100 according to the invention, which as already described above is arranged on the piston engine 3. The exhaust gas moved out of the combustion chamber 2 during the upward movement of the piston 14 leaves the combustion chamber 2 through the outlet 1 and accelerates along the channel axis 8 into the flow channel 6. According to this exemplary embodiment this flow channel is embodied in two parts and comprises a first part 6a and a second part 6b. The first part 6a of the flow channel 6 forms a first opening 12 in the direction of the first chamber 4 wherein the second part 6b of the flow channel 6 forms a second opening 13 in the direction of the combustion chamber 2. Here, the first opening 12 extends at least partially into the second opening 13. Between the second opening 13 and the first opening 12 a circumferential radial spacing is formed through which the main outlet 7b is formed. A third section of the flow channel is designated with the reference number 6c and forms the part which extends out of the silencer housing 11 and forms the connection to the piston engine 3. The first chamber 4—as already described above—is formed through a wall 10 which merges as one part with the second part 6b of the flow channel 6, wherein an auxiliary outlet 9 is provided in the wall 10 through which a part of the exhaust gas can directly overflow from the first chamber 4 into the second chamber 5.

Through the arrangement of the first opening 12 within the second opening 13 with a partial section via which the first opening 12 extends into the second opening 13 it is made possible that the exhaust gas initially flows predominantly into the first chamber 4. Only upon formation of back pressure and a return flow of the exhaust gas from the second part 6b into the first part 6a of the flow channel 6 can the exhaust gas overflow into the second chamber 5 through the main outlet 7b. Overflowing in the mentioned flow direction is favoured through the geometrical embodiment of the main outlet 7b since a directional change of the moved exhaust gas from the direction of the first chamber 4 is not required in order to flow through the main outlet 7b. Nevertheless, sufficient back pressure remains in the first section of the flow channel 6a in order to provide a sufficiently high back pressure against the outlet 1 of the combustion chamber 2.

FIGS. 4 and 5 show corresponding embodiments wherein identical parts have been given the same reference numbers as in FIG. 2. In the embodiment according to FIG. 4 it is provided that the second opening 13 of the second part 6b at least partially extends into the first opening 12 of the first part 6a while with the embodiment according to FIG. 5 it is provided that the first opening 12 of the first part 6c and the second opening 13 of the second part 6 are arranged opposite each other subject to the formation of a gap or ring gap 20.

The present invention in its embodiment is not restricted to the preferred exemplary embodiment stated above. On the contrary, a number of versions is conceivable which principally make use of embodiments of a different type to the solution shown. More preferably the geometrical design of the main outlet 7 is not limited to the form shown. A multiplicity of small main outlet channels 7a in a radially circumferential arrangement in the flow channel 6 forms a possible alternative embodiment. The arrangement of the main outlet 7 can preferably be placed near the outlet 1 in order to make possible adequately high acceleration of the return flow from the direction of the first chamber 4 towards the outlet 1.

The invention claimed is:

1. A silencer for a motor device with a two-stroke engine connected to an outlet of a combustion chamber of the engine, comprising:
a first chamber and a second chamber, wherein the second chamber is formed surrounding the first chamber by a wall of a silencer housing such that the first chamber is enclosed by the second chamber;
means for directing substantially all exhaust gas from the outlet of the combustion chamber into the first chamber and by-passing the second chamber such that the predominant part of the exhaust gas flows into the first chamber before flowing into the second chamber, said means for directing comprising a single, undivided flow channel extending from the outlet concentrically about a channel axis and into the first chamber, characterized in that the flow channel is flow-favourably shaped in a straight line such that exhaust gas that flows out of the outlet predominantly flows into the first chamber because of its mass inertia; and
means for redirecting the exhaust gas from the first chamber through the flow channel to the second chamber after filling the first chamber and forming a back pressure in the direction of the combustion chamber, said means for redirecting comprising a main outlet in the flow channel forming a flow connection between the flow channel and the second chamber, said main outlet comprising a pipe section oriented substantially perpendicular to the channel axis and forming a T-shaped connection with the flow channel.

2. The silencer according to claim 1, characterized in that the volume ratio of the first chamber to the flow channel is embodied in such a manner that out of the first chamber back pressure is built up in the direction of the combustion chamber when a stroke-moveable piston is in a stroke position in which overflow channels in the combustion chamber are closed but the outlet is not closed through the upwardly directed stroke movement of the piston.

3. The silencer according to claim 2, characterized in that the back pressure is formed from a return flow out of the first chamber and at least partially out of the flow channel.

4. The silencer according to claim 1, characterized in that an auxiliary outlet is provided which extends through a wall of the first chamber and at least a part of the exhaust gas flows through the auxiliary outlet from the first chamber into the second chamber.

5. The silencer according to claim 1, characterized in that the combustion chamber of the piston engine has a piston volume, wherein the volume of the first chamber is between one-half and a full piston volume.

6. The silencer according to claim 1, characterized in that the first chamber is formed on an end side on the flow channel, wherein the flow channel merges as one part with the wall of the first chamber.

7. The silencer according to claim 6, characterized in that the flow channel is led out of the wall of the silencer housing and the silencer via the part of the flow channel led out of the silencer housing is connected with the engine.

8. A silencer for a motor device with a two-stroke engine connected to an outlet of a combustion chamber of the engine, comprising:
a first chamber and a second chamber, wherein the second chamber is formed surrounding the first chamber by a wall of a silencer housing such that the first chamber is enclosed by the second chamber;
means for directing substantially all exhaust gas from the outlet of the combustion chamber into the first chamber and by-passing the second chamber such that the predominant part of the exhaust gas flows into the first chamber before flowing into the second chamber, said means for directing comprising a single, undivided flow channel extending from the outlet concentrically about a channel axis and into the first chamber, characterized in that the flow channel is flow-favourably shaped in a straight line such that exhaust gas that flows out of the outlet predominantly flows into the first chamber because of its mass inertia; and
means for redirecting the exhaust gas from the first chamber through the flow channel to the second chamber after filling the first chamber and forming a back pressure in the direction of the combustion chamber, said means for redirecting comprising a main outlet in the flow channel forming a flow connection between the flow channel and the second chamber, characterized in that the flow channel is embodied in two parts and comprises an interruption which is ring-shaped about the channel axis, said ring-shaped interruption comprising the main outlet.

9. The silencer according to claim 8, characterized in that the flow channel comprises a first part which is connected with the combustion chamber of the engine, and a second part which is connected with the first chamber.

10. The silencer according to claim 9, characterized in that the interruption brings about a separation of the parts of the flow channel and forms the main outlet of the flow channel.

11. The silencer according to claim 8, characterized in that the first part of the flow channel forms a first opening in the direction of the first chamber and the second part of the flow channel forms a second opening in the direction of the combustion chamber, wherein the first opening of the first part at least partially extends into the second opening of the second part, or that the second opening of the second part extends at least partially into the first opening of the first part or the first opening of the first part and the second opening of the second part are arranged opposite each other subject to the formation of a gap or ring gap.

12. The silencer according to claim 11, characterized in that a circumferential radial spacing extends between the second opening and the first opening through which the main outlet is formed.

13. A two-stroke piston engine, with a silencer, which is in connection with the outlet of a combustion chamber of the piston engine, wherein the silencer comprises:
- a first chamber and a second chamber, wherein the second chamber is formed surrounding the first chamber by a wall of a silencer housing such that the first chamber is enclosed by the second chamber;
- means for directing substantially all exhaust gas from the outlet of the combustion chamber into the first chamber and by-passing the second chamber such that the predominant part of the exhaust gas flows into the first chamber before flowing into the second chamber, said means for directing comprising a single, undivided flow channel extending from the outlet concentrically about a channel axis and into the first chamber, characterized in that the flow channel is flow-favourably embodied in a straight line such that the exhaust gas flowing from the outlet predominantly flows into the first chamber because of its mass inertia; and
- means for redirecting the exhaust gas from the first chamber through the flow channel to the second chamber after filling the first chamber and forming a back pressure in the direction of the combustion chamber, said means for redirecting comprising a main outlet in the flow channel forming a flow connection between the flow channel and the second chamber, said main outlet comprising a pipe section oriented substantially perpendicular to the channel axis and forming a T-shaped connection with the flow channel.

14. A silencer for a motor device with a two-stroke engine connected to an outlet of a combustion chamber of the engine, comprising:
- a first chamber and a second chamber, wherein the second chamber is formed surrounding the first chamber by a wall of a silencer housing such that the first chamber is enclosed by the second chamber;
- a single, undivided flow channel extending from the outlet and into the first chamber, wherein the flow channel passes through the second chamber and the wall of the silencer housing, said flow channel having a main outlet communicating with the second chamber forming a flow connection between the flow channel and the second chamber;
- said flow channel configured in a straight line such that all exhaust gas flowing out of the outlet enters the flow channel and initially flows past the main outlet into the first chamber because of its mass inertia, and after filling the first chamber forms a back pressure in the direction of the combustion chamber.

* * * * *